June 24, 1930.  F. DRISCOLL  1,768,195
BEET HARVESTING MACHINE
Filed Sept. 19, 1927   5 Sheets—Sheet 1

Witnesses
C. E. Churchman
Geo. H. Dibbs

Inventor
Fred Driscoll
By Richard B. Owen
Attorney

Fred Driscoll, Inventor

Patented June 24, 1930

1,768,195

UNITED STATES PATENT OFFICE

FRED DRISCOLL, OF NISLAND, SOUTH DAKOTA

BEET-HARVESTING MACHINE

Application filed September 19, 1927. Serial No. 220,579.

This invention relates to a beet harvesting machine and forms a continuation of the application filed under date of January 10, 1927, Serial No. 160,315, In connection with this application attention is invited to my co-pending application filed February 20, 1928, Ser. No. 255,830.

This invention has for its primary object the provision, in a manner as hereinafter set forth, of a machine employing a band saw unit designed and arranged to cut off the fibrous tops of the sugar beets while in place in the fields.

Another object of the invention is to provide a means for casting aside the removed tops and extracting the beets from the ground so that the same can be readily gathered.

Still another object of the invention is to provide, in a manner as hereinafter set forth, in a beet harvesting machine a means for automatically adjusting the top cutting device or saw with respect to each beet preparatory to cutting the top therefrom so that each and every beet will have the top removed close to the body without cutting into beet and wasting any of the valuable part thereof.

The present beet harvesting machine has for a further object the provision, in the manner as hereinafter set forth, of means for gathering the foliage of the standing beet toward the center of the row in the event that the same is out of the row line, so that the cutting blade can operate thereon.

A further object of the invention is to provide an improved means for securing the proper tension on the band saw blade and alignment of the idler rollers over which the saw passes, in one operation or adjustment.

Another improved feature of the present structure resides in the provision of means for scraping the band saw blade to remove dirt or foliage of the beet top which might cling thereto to interfere with the action of the saw blade.

Numerous other objects and advantages of the present invention will become apparent as the description of the same proceeds and the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modification mark no material departure from the salient features of the invention as expressed in the appended claims.

In the drawings:

Figure 6 is a section taken substantially upon the line 6—6 of Figure 3.

Figure 7 is a section taken substantially upon the line 7—7 of Figure 5.

Figure 8 is a view in side elevation of the beet top contacting roller which controls the counter balanced mechanism, showing the manner in which the traction wheels for the counter balanced mechanism are resiliently supported.

Figure 9 is a section taken upon the line 9—9 of Figure 6.

Figure 2:
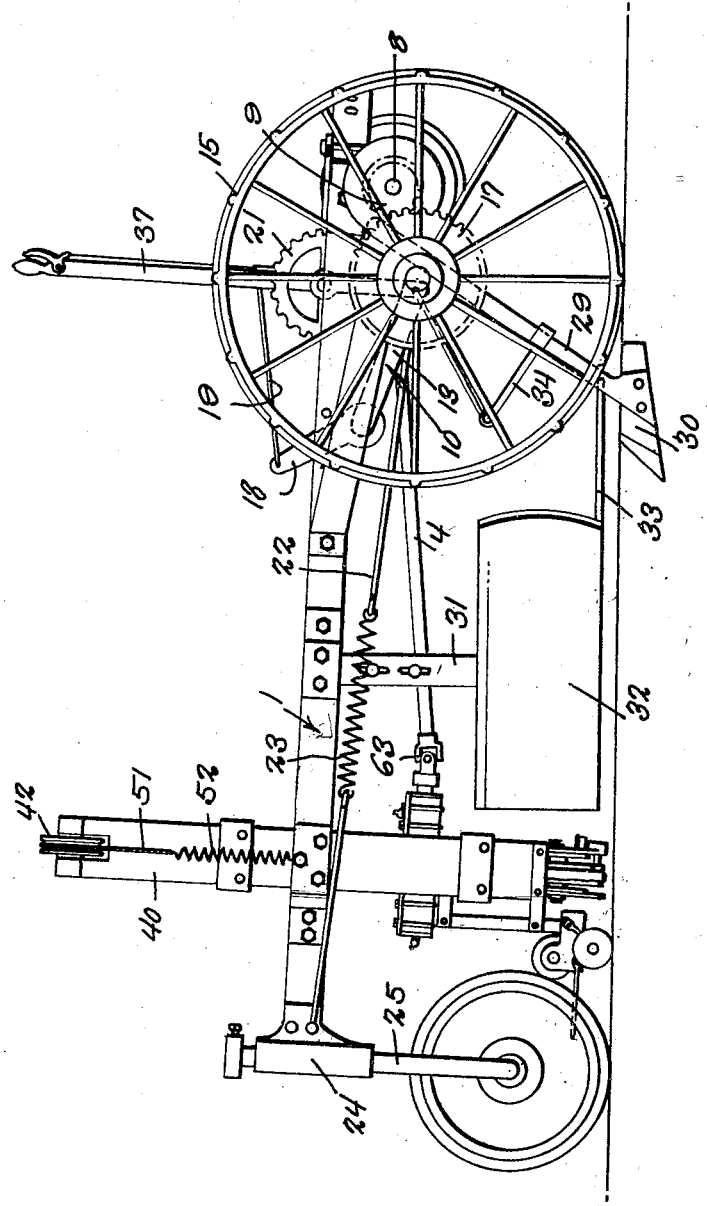
Figure 2 is a view in side elevation of the machine.

Referring now to the drawings in detail wherein like numerals of reference indicate corresponding parts throughout the several views, the numeral 1 indicates the main frame of the machine which as shown in Figure 2 is of elongated rectangular configuration.

Extending transversely of the rear of the frame 1 and supported therefrom is a shaft housing 2 which at the center merges into a differential housing 3 from which a mechanism drive shaft 4 extends to the forward portion of the frame and to the beet topping mechanism hereinafter described. The outer ends of the housing 2 are braced by the brace rod 5 which connects to the plate 6 at one end and at the other ends are attached to the main frame 1 as indicated at 7. The shafts 8 which extend longitudinally through the housing 2 terminate at their outer ends in the gear pinions 9.

Extending transversely of the frame 1 forwardly of the housing 2 is a substantially U shaped axle indicated generally by the numeral 10. This axle has the straight central or yoke portion 11 which is mounted in the bearings 12 carried by the frame and the divergent arms 13 which terminate in the laterally directed portions 14 which are arranged in alignment transversely of the machine. These lateral portions of the axle 10 carry the machine traction wheels 15, the surfaces of which are provided with ground engaging fins to insure positive engagement, and the hubs 16 of these wheels extend inwardly a substantial distance as shown and carry the gears 17 which mesh with the adjacent pinion gears 9 to rotate the axles 8 when the machine is in motion.

The axle 10 is supported for oscillation in the bearings 12 and carries the arm 18 which has connected at its free end the pull link 19, attached at its other end to the control lever 20 mounted adjacent the toothed segment 21 which is secured to the main frame as shown. From this it will be understood that upon swinging the lever 20 the axle 10 will be oscillated to shift the machine frame vertically for the purpose hereinafter to be pointed out.

Connecting the axle section 14 with the forward part of the frame, upon each side thereof, are link members 22 each pair of links upon each side of the frame being connected by the spring 23. This spring connection between the ends of the axle and the frame is designed to assist in the oscillating of the axle for the purpose of raising the frame from the ground.

At the forward corners of the frame 1 there are formed the vertical bearings 24 in each of which the vertically directed post portion 25 of an horizontal axle 26, is mounted. Each of these axles 26 carries a front wheel 27, which wheels support the forward end of the frame as will be readily understood.

Figure 1:
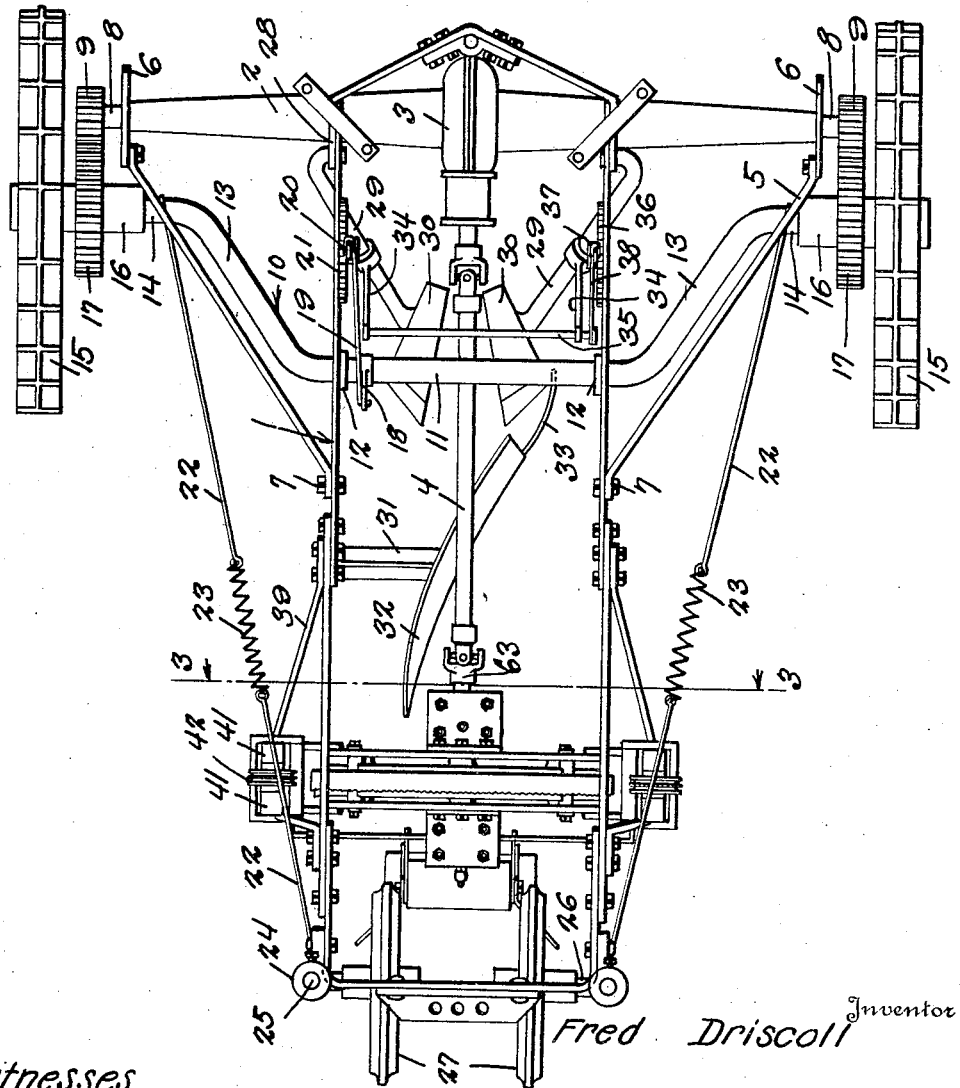
Figure 1 shows the machine embodying the present invention in top plan.

Pivotally mounted on the brackets 28 which are carried upon the housing 2 are forwardly and downwardly directed plow supporting arms 29, these arms being directed downwardly in convergent relation as clearly shown in Figure 1 and each carrying a plow blade 30 upon its lower end, these blades being spaced a greater distance apart at the front than at the rear as shown. By means of the lifting lever 20 the machine frame 1 is lowered to a position where these plow blades 30 will engage into the ground to a depth sufficient to effectively remove the beets from the ground as they pass between the blades.

Mounted forwardly of the plow blades upon a bracket arm 31 secured to one side of the frame 1, is a curved elongated shield 32 which is arranged beneath the power shaft 4 at an acute angle with respect to the longitudinal center of the frame, the rear of this shield having extending therefrom in alignment with the lower edge, the tail piece 33. As will be readily seen from the future description of the machine this shield 32 and tail piece 33 act to throw the removed or severed beet tops to one side of the beet row as the machine advances thereover.

Each of the plow blade carrying arms 29 has a lifting arm 34 secured at one end thereto, the other ends of each of these arms being attached to the cross rod 35. On the side of the frame 1 opposite the side to which the segment 21 is attached, there is secured a toothed segment 36 having pivotally mounted at one side thereof the lever 37 from which lever there extends the control link 38, the other end of this link being attached to the cross bar 35 as shown in Figure 1. From this it will be seen that upon oscillating the lever 37 the cross bar 35 will be raised raising also the lift arms 34 which in turn bear upwardly upon the arms 29 carrying the plow blades 30. In this manner the depth of penetration of the plow blades 30 can also be regulated independently of the regulating means provided in the provision of the pivoted axle 10.

Attached to the outer side of each side rail of the frame, forwardly of the top discarding shield, there is secured a bracket 39 in the form of a bar, each end of which is secured to the frame while the central portion thereof stands away from the adjacent frame side rail as clearly shown in Figure 1. Secured to the central portion of each of the bracket bars 39 there is a vertical post 40, the upper end of each of these posts being turned to form a bearing 41 the central portion of each of which bearings is cut away to receive the pulley 42, a pivot pin 43 extending through the pulley and through the two bearing sections thus formed.

Each of the fixed posts 40 carries at the lower end and at a point above the bracket 39, a guide block 44. The fixed posts 40 pass through a passage 45 in the blocks 44 and each of the posts has formed therein an aperture 46 in that portion which is housed in the blocks through which aperture a roller 47, pivotally mounted within each block, projects. Extending through each of the passageways 45 of the blocks 44 is a vertically shiftable post 48 one face of which is in contact with the roller 47 while the other face thereof has a similarly formed roller 49 bearing thereagainst which roller is carried also by the block 44. The upper end of each of the shiftable posts has a pin 50 secured thereto, to which one end of a cable 51 is attached, the cable passing upwardly and over the adjacent pulley 42 and having its other end attached to one end of a coiled spring 52, the other end of which spring is secured to the bracket 39. These springs maintain the posts 48 and the hereinafter described structure carried thereby, in suspension as will be hereinafter more clearly pointed out.

Secured to the inner face of each of the posts 48 at the lower end thereof, is a frame indicated as a whole by the numeral 53, each of these frames comprising an upper and lower cross bar 54 the ends of which cross bars are connected by the inwardly directed substantially semi-circular members 55.

Secured to and suspended by the portions 55 of the brackets 53, in spaced aligned relation are horse shoe shaped frames 56, the radial centers of these frames 56 aligning upon the longitudinal center of the machine, the ends of the same being spaced a slight distance above the ground.

Figure 4:
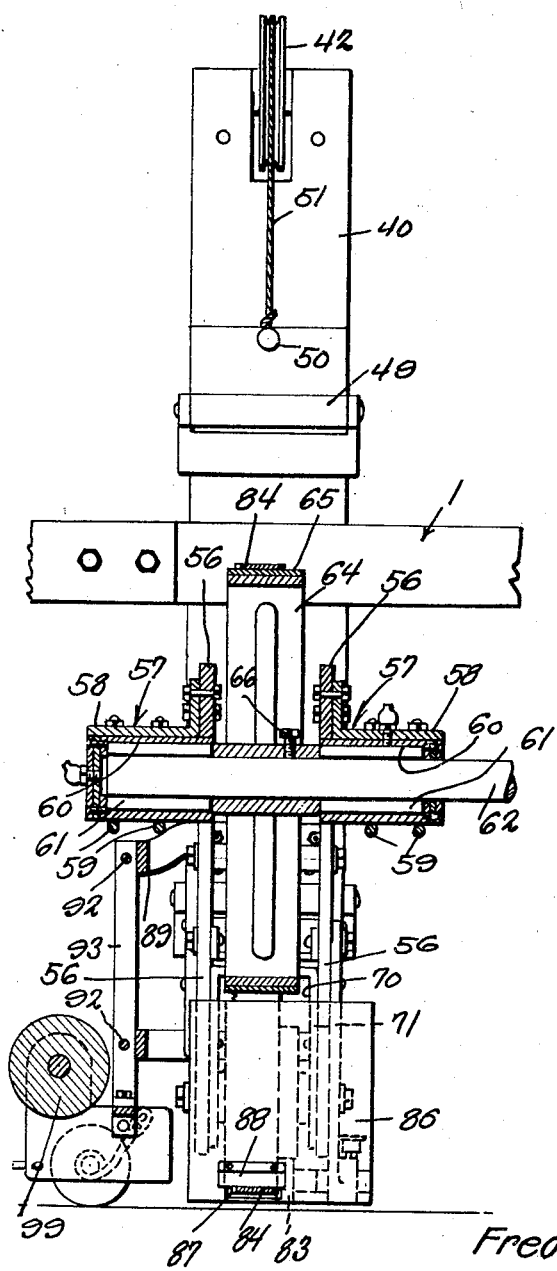
Figure 4 is a section taken upon the line 4—4 of Figure 3.

The center of each frame 56 has secured to the outer face thereof the L shaped brackets 57 each bracket having a substantially horizontal portion 58 directed at right angles away from the face of the frame as clearly shown in Figure 4. Each horizontal portion 58 of each bracket 57 supports a pair of U bolts 59 which have passed therethrough and in turn support the bearing shell 60 within which shells the roller bearings 61 are housed.

Extending through the bearings 60 and 61 is a shaft 62, the rear end of which is connected by the universal joints 63 to the power shaft 4. Mounted upon the shaft 62 between the frames 56 is a band saw pulley or wheel 64 the peripheral surface of which is covered with an anti-slipping material such as rubber or cork, to prevent the band saw passing thereover from slipping. The hub of the wheel 64 is provided with the set screw 66 which engages the shaft 62 to secure the wheel thereon.

Figure 5:
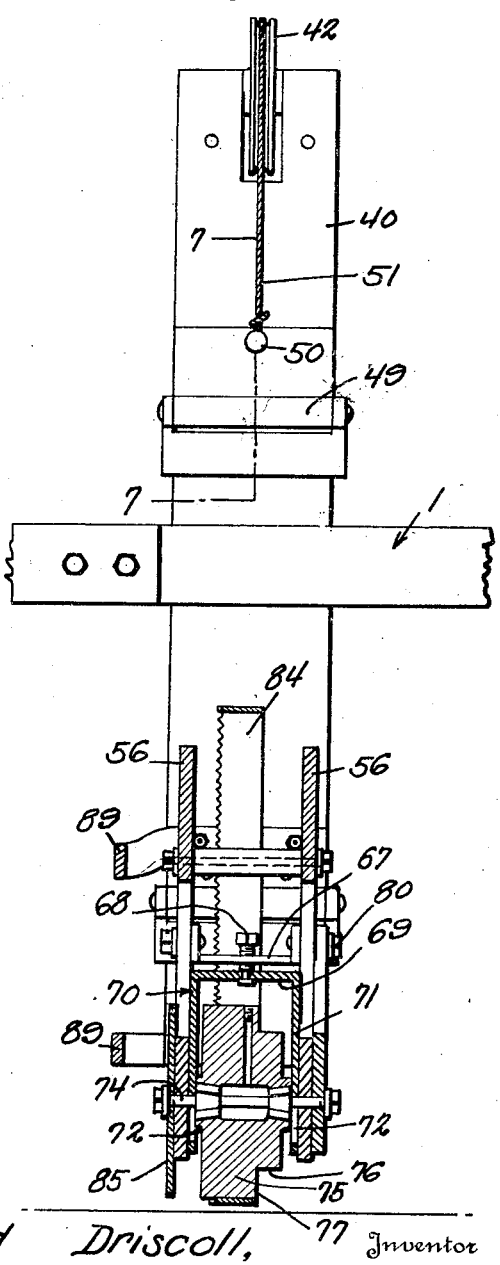
Figure 5 is a section taken upon the line 5—5 of Figure 3.

Secured between the frames 56 adjacent the free ends of the legs thereof are plate members 67 the central portion of each of which is provided with a threaded aperture. Extending through the threaded aperture into the plate 67 is a screw 68 the lower end of which is swivelly connected in the yoke portion 69 of an inverted substantially U shaped frame indicated as a whole by the numeral 70. Each of the legs 71 of each frame is provided with an elongated slot 72 adjacent the free end thereof as shown in Figure 5 and these legs bear against the inner faces of the adjacent frames as is also clearly shown in this figure.

Adjacent the free end of each leg of the frame 56 there are formed through the leg the transversely extending arcuate slots 73 and arranged between the ends of the front and rear legs of the frames is a shaft 74 the ends of which extend through the slots 72 of the frame 70 and the slots 73 in the legs of the frame 56. Mounted upon each of the shafts 74 is a pulley wheel 75, the rear face of which is provided with the annular recess 76 which opens through the periphery of the pulley forming the shoulders 77. The legs of the rear frame 56 are each provided above the arcuate slots with the substantially vertically extending slots 78 and each of these legs has positioned against the rear face thereof the elongated plate 79 the upper end of which is apertured to receive a bolt 80 that passes through the slots 78 of the adjacent frame legs while the lower end of each of these plates is apertured in alignment with the arcuate slots 73 to receive the end of the shaft 74.

The lower end of each plate 79 is formed to set up the bearing 81 in which a stub shaft 82 is mounted the inner end of which stub shaft carries a guide roller 83 which positions in the groove 76 of the adjacent saw pulley wheel 75 and bears against the shoulder 77 thereof. As will be hereinafter seen these wheels or rollers 83, extending beyond the peripheral surfaces of the pulley wheel 75 with which they contact, prevent the band saw from working from position about the pulley wheel.

Figure 3:
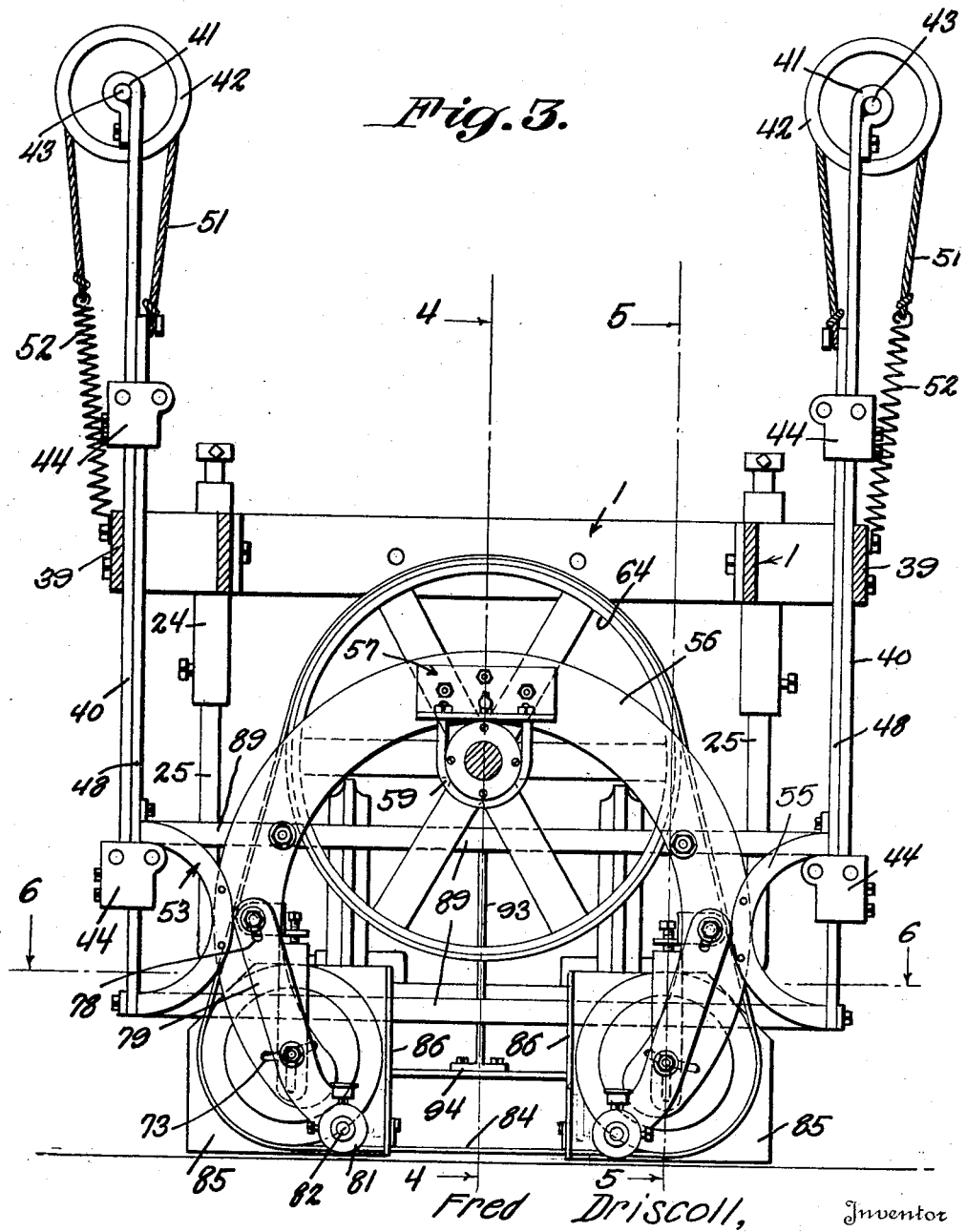
Figure 3 is a section taken substantially upon the line 3—3 of Figure 1, looking toward the front of the machine.

A band saw 84 passes about the main drive wheel 64 and the two pulleys 75 as clearly shown in Figure 3, a portion of the saw passing in horizontal manner across the surface of the ground between the pulleys 75 as shown.

Secured to the forward one of the frames 56, adjacent each free end thereof, is a shield plate 85 which covers the forward face of the adjacent band saw pulley 75 and each of these plates 85 has the inner edge provided with the rearwardly extending wing 86. These wings 86 are in spaced parallel relation and the beet tops pass therebetween to be cut. As shown in Figure 4 each of the wings 86 is provided with an opening adjacent the lower edge thereof for the passage of the band saw, these openings being indicated by the numerals 87 and secured to each wing above the saw is a wiper 88 which normally bears against the saw and acts to remove dirt and other matter therefrom.

Arranged across the front of the forward frame 56 in vertically spaced relation, is a pair of transverse supporting bars 89 each of which has a rearwardly directed leg at each end, as indicated by the numeral 90 which is secured to the lower end of the adjacent shiftable post 48. Arranged centrally between the ends of each cross bar 89 is a pair of ears 91 and positioned between these ears and secured thereto by the pins 92 is a vertical supporting post 93 the lower end of which has the laterally directed arms 94 which are secured to a bar 95 which extends transversely of the machine and has secured to each end the vertically and forwardly directed plates 96. These plates are arranged as shown in Figure 6, in spaced parallel relation at opposite sides of the longitudinal center of the machine and each has its forward top edge provided with the upstanding ear 97 between which ears a shaft 98 extends for the support of a beet top contact roller 99. The outer face of each plate 96 has secured thereto one end of a resilient supporting arm 100, the free end of which is formed to provide a bearing 101 to receive one end of the stub-shaft 102 upon which is mounted the roller 103. As shown these rollers 103 project beyond the lower edges of their respective plates and normally lightly contact with the ground to maintain the foregoing described structure, all of which is resiliently supported by and between the vertically reciprocable posts 48 through the medium of the springs 52, in proper spaced relation to the ground.

The pair of forwardly directed laterally extending antennæ 104, each of which is carried by a plate 96, are provided to gather in those beet tops which are out of the direct line of the row so that the same will be forced to pass between the guide wings 86 to be cut by the band saw 84.

The beet topping mechanism which has been described as suspended by the shiftable post 48 is designed to shift vertically to adjust the saw 84 to the proper position for severing the tops of the beets close to the body thereof, by the pressure exerted by the beet top against the roller 99 as the same passes thereover, the balance of the mechanism being such that the upward pressure exerted by the beet top on this roller will cause the entire mechanism to rise to the desired position, the mechanism of course lowering itself after passing over the beet top, until the rollers 103 again contact with the ground.

As will be readily understood from the foregoing description the power transmitted from the rear supporting wheels 15 of the machine to the drive shaft 4, will rotate the wheel 64 and cause the continuous movement of the band saw 84 about the wheel and the pulleys 75.

Adjustment of the pulleys 75 to increase or decrease the tension of the saw is effected by the loosening of the set screw 68 and then swinging the plates 79 apart or toward one another as desired. If the pulleys 75 are to be drawn together this can be affected by drawing upwardly upon the set screws 68 to permit the shafts 74 supporting the pulleys to be moved in the slots 73 toward the center of the machine. Reversal of this action will of course move the pulleys apart and consequently tighten the band saw. As before described the wheels or rollers 83 working in the annular groove formed about each of the pulleys 75 prevent the band saw from working off of the pulleys.

From the foregoing description it will be readily seen that by drawing a machine of this character over and longitudinally of the row of beets the tops thereof will all be severed at the proper point, and thrown to one side of the row, the beet bodies being extracted from the ground by the plow blades 30 as the machine passes on.

Having thus described my invention what I claim is:

1. In a beet harvesting mechanism of the character described, a wheel supported frame, a pair of standards carried by said frame on opposite sides thereof, a pulley member secured to the upper end of each standard, a vertically shiftable standard arranged against the inner face of each of said first mentioned standards, a supporting cable supported at one end to the upper end of each of said shiftable standards and passing over the adjacent pulley, a resilient connection between the other end of each of said cables, and a fixed portion of said frame, a top cutting mechanism arranged between and supported by said shiftable standards, beet top directing elements carried by and arranged forwardly of said mechanism, and means carried by the mechanism for contacting with a beet top to cause a vertical shifting of the mechanism to arrange the same in accordance with height of the beets to be operated upon.

2. In a beet harvester, a wheel supported frame, a second frame, means connecting said second frame to said first frame for vertical shifting movement with respect thereto, means yieldingly supporting said second frame, beet top cutting means carried by said second frame, a beet top contacting roller arranged in advance of said cutting means, means for supporting said roller from said second frame, ground contacting rollers arranged at the ends of said first roller, means yieldingly connecting said ground contacting rollers to said roller supporting means, and operating means for said cutting means.

3. In a beet harvester, a wheel supported frame, a second frame, means connecting said second frame to said first frame for vertical shifting movement with respect thereto, means yieldingly supporting said second frame, bearings secured to said second frame in relatively spaced relation, a shaft journaled in said bearings, a pulley secured to said shaft between said bearings, other pulleys journaled on said second frame below said first pulley, a band saw supported by said pulleys, and driving means connected to said shaft.

4. In a beet harvester, a wheel supported frame, a second frame, means connecting said second frame to said first frame for vertical shifting movement with respect thereto, means yieldingly supporting said second frame, a pulley journaled on said second frame, said second frame being provided with arcuate slots arranged below and at opposite sides of said pulley, U-shaped frames having vertical slots intersecting said arcuate slots, means for adjusting said U-shaped frames vertically with respect to said second frame, plates pivoted to said second frame and provided with openings registering with said slots, shafts passing through said slots and openings, pulleys carried by shafts, a band saw carried by said pulleys, and driving means connected to said first pulley.

5. In a beet harvester, a wheel supported frame, a second frame, means connecting said second frame to said first frame for vertical shifting movement with respect thereto, means yieldingly supporting said second frame, a pulley journaled on said second frame, said second frame being provided with arcuate slots arranged below and at opposite sides of said pulley, U-shaped frames having vertical slots intersecting said arcuate slots, means for adjusting said U-shaped frame vertically with respect to said second frame, plates pivoted to said second frame and provided with openings registering with said slots, shafts passing through said slots and openings, pulleys carried by said shafts, a band saw carried by said pulleys, guide rollers carried by said plates and cooperating with said second pulleys, and driving means connected to the said first pulley.

In testimony whereof I affix my signature.

FRED DRISCOLL.